J. D. ROOTS.
MEANS FOR CONTROLLING AND INCREASING THE SPEED AND POWER OF
INTERNAL COMBUSTION ENGINES.
APPLICATION FILED MAR. 23, 1915.
1,280,852.
Patented Oct. 8, 1918.
2 SHEETS—SHEET 1.
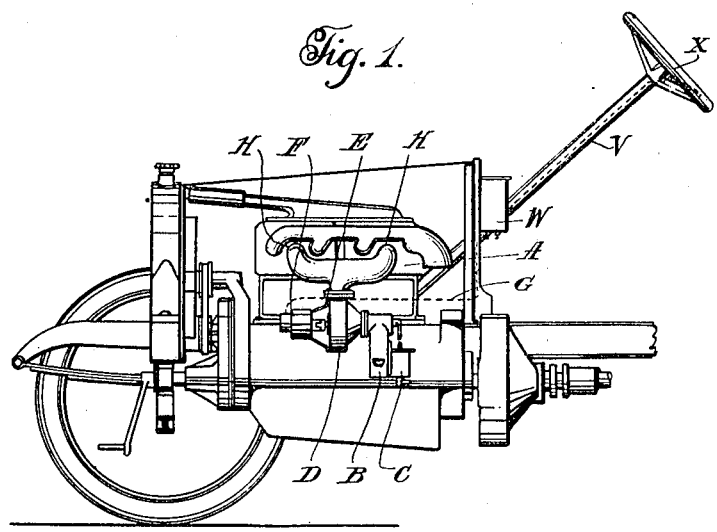
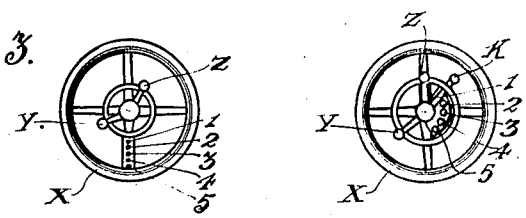
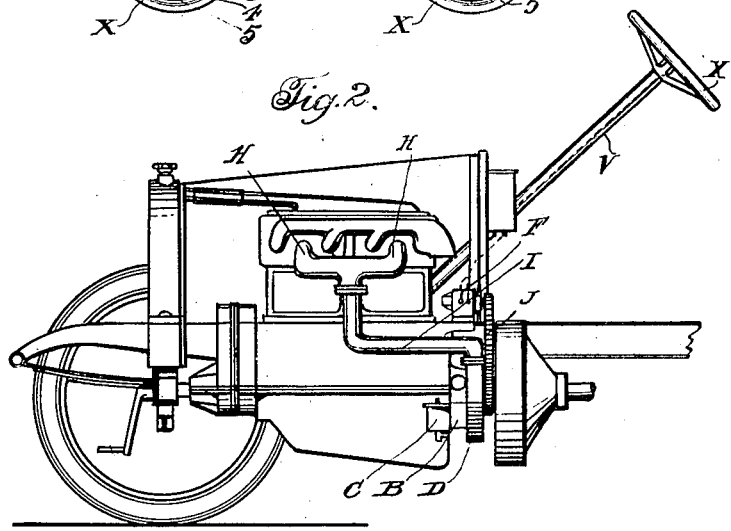

J. D. ROOTS.
MEANS FOR CONTROLLING AND INCREASING THE SPEED AND POWER OF
INTERNAL COMBUSTION ENGINES.
APPLICATION FILED MAR. 23, 1915.

1,280,852.

Patented Oct. 8, 1918.
2 SHEETS—SHEET 2.

Witnesses:
C. A. King
Jn. E. Hitchinson

Inventor:
James D. Roots,
By Bacon Milans
Attys

UNITED STATES PATENT OFFICE.

JAMES DENNIS ROOTS, OF WEST KENSINGTON, LONDON, ENGLAND.

MEANS FOR CONTROLLING AND INCREASING THE SPEED AND POWER OF INTERNAL-COMBUSTION ENGINES.

1,280,852.   Specification of Letters Patent.   Patented Oct. 8, 1918.

Application filed March 23, 1915. Serial No. 16,374.

*To all whom it may concern:*

Be it known that I, JAMES DENNIS ROOTS, a subject of the King of Great Britain, and a resident of 58 Avonmore road, West Kensington, London, W., England, have invented new and useful Improvements in Means for Controlling and Increasing the Speed and Power of Internal-Combustion Engines, of which the following is the specification.

This invention relates to improvements in means for controlling and increasing the speed and power of internal combustion en-engines, and particularly to an improved method or principle of employing carbureters or the like in connection with internal combustion engines.

The object of the invention is to provide means for obtaining a direct control of the power and speed of the engine and thereby of the car or other vehicle or the like which the engine is employed to propel. This object is effected by varying and directly controlling the feed of mixture of liquid fuel or air or new charge, or both, by varying the driven speed of the fan or blower or the like employed to deliver the mixture or the like to the cylinders of the engine at a slight pressure. This variation and control is effected by introducing variable and controlling means between the source of power and the carbureter fan or pump, so that the carbureter fan or the like may be either driven at normal speed or if desired not used at all for lowest powers required, but when a greatly increased output is required from the engine when the car for example is required to ascend a hill, or to attain its maximum speed on the level, the carbureter fan or blower speed is greatly increased or set in motion at a speed commensurate with the desired power in order to fill the cylinders by delivering mixture or the like at a higher pressure so as to give the increase of power desired.

By this means the internal combustion engine becomes similar in action to the steam engine so far as flexibility and control are concerned, the mixture or gas being fed to the engine approximately in accordance with the power required from it, and the necessity for the employment of change speed gear wheels as employed on motor vehicles, if not removed, becomes of rare occurrence for forward drive.

And in order that my invention may be completely understood reference should be made to the accompanying sheets of drawings showing some examples of my invention in which a centrifugal fan is shown as the pressure feeding means for increased power of the engine, and an ordinary carbureter is shown.

Figure 1 is a side elevation of an engine and carbureter arranged on the front of a motor vehicle with the electric controlling means on the steering wheel.

Fig. 2 shows a modified arrangement and construction with the carbureter fan on the engine shaft and at the back of the engine with the electric motor arranged to overrun the engine when greater power is required.

Fig. 3 shows one method of operating the control by the hand of the driver as arranged on the steering wheel.

Fig. 4 shows another method of operating control fitted to the steering wheel.

Referring to Fig. 1 of the drawings, A is the engine of the four stroke type, and having four cylinders, B is the carbureter, C is the usual float feed chamber, D is the centrifugal fan casing, E is a bracket integrally formed or secured to the casing upon which is secured the small electric motor F. This motor may be energized by any suitable source of electrical current, but it is conveniently connected to and supplied by the lighting set of the car if this be carried. The wire G connected thereto shown in dotted lines is carried on the dashboard switchbox or the like W, and thence up the steering pillar V to the steering wheel X. In this arrangement the fan is not driven unless the electric motor is energized by the mechanism to be afterward described placed upon the steering wheel and operated by the hand of the driver. Until the electric motor is switched on to drive the fan the carbureter B which may be of any known kind, operates in the usual manner by the suction of the engine. The electric motor when switched on by the driver, drives the fan at a varying speed to effect the required control, thereby varying the quantity of mixture or gas delivered to the engine and consequently the power of the engine. Instead of the engine at approximately its full speed when running with the carbureter acting normally and with a vacuum in the induction pipes H, H, working as it is known that four stroke engines frequently do with approximately only half a cylinder full of mixture when at the end of the suction stroke, each cylinder may be filled, as the fan may be driven at a much higher speed than the engine crank shaft. Not only therefore may the power of the engine be increased but by varying the speed of the electric motor and fan, the quantity of mixture or gas may be varied approximately in accordance with the power required from the engine.

Figure 5:
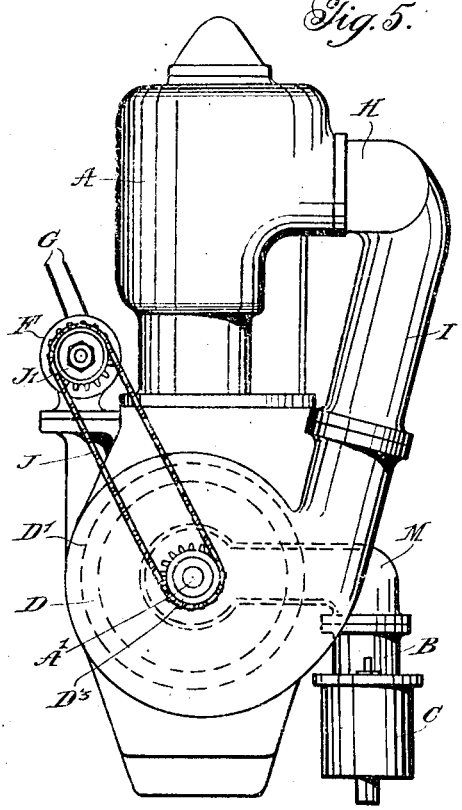
Fig. 5 shows an end elevation of the engine and carbureter with the carbureter pressure fan arranged in front of the engine but otherwise similar to the arrangement shown on a smaller scale in Fig. 2.
Figure 6:
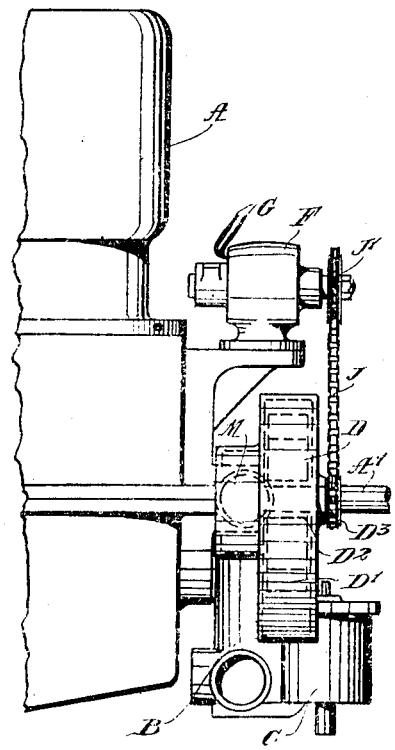
Fig. 6 is a side elevation of the controlled pressure carbureting apparatus shown in Fig. 5.

Referring to Fig. 2, and also to Figs. 5 and 6, which are end view and part elevation respectively of an engine with similar apparatus to that in Fig. 2, the centrifugal fan casing D is placed at the back end of the engine in Fig. 2, and between the crank chamber and flywheel. In Figs. 5 and 6 the fan casing is placed in front of the engine. In Fig. 2 and also in Figs. 5 and 6 the centrifugal fan in the fan casing D is mounted on the crank shaft, and I is the connecting pipe for conveying mixture from the fan casing to the usual induction pipes H, H. In this arrangement the fan $D^1$ shown in dotted lines in Fig. 5 is of larger diameter. The fan $D^1$ is mounted upon a sleeve $D^2$ upon the crank shaft $A^1$ secured to an outer sprocket ring $D^3$ forming part of an ordinary free wheel or one-way clutch secured to the shaft $A^1$, so that normally it is driven at the same speed as the crank shaft and the fan is always more or less in operation to deliver the mixture at a pressure to the engine. The inner ring of the free wheel or one-way clutch is keyed or secured to the crank shaft $A^1$. The outer ring is connected by the chain J to the sprocket wheel $J^1$ secured on the shaft of the electric motor F. B is the carbureter of any known construction. C is the float feed chamber. M is the pipe for conveying the mixture from the carbureter B to the eye of the fan casing D. H is the induction pipe conveying the mixture from the carbureter delivered by the fan at a pressure to the engine.

Normally the fan is driven at the same speed as the crank shaft, thus increasing the power of the engine by producing an increased pressure in the induction pipe as compared with the usual vacuum or negative pressure therein when employing an ordinary vacuum carbureter alone, but when greater power as for ascending hills, or increased speed as for high speed on the level is required, the current to the electric motor F is switched on, to produce the desired speed of the fan and a corresponding increased pressure of delivery of mixture or gas to the engine, and a more complete filling of each cylinder of the engine in accordance with the controlled pressure of supply.

Referring to Fig. 3, this represents the steering wheel in plan, the levers Y Z are those commonly used for throttling and ignition control. The press buttons 1, 2, 3, 4, 5, arranged on one arm of the wheel, serve as switches to provide varying resistances in known manner to the current passing to the electric motor, whereby the speed of the electric motor may be varied and controlled. For example, by pressure of the button I, the electric motor and therefore the fan may be driven at a speed of say 2,000 revolutions, while operating the button 5 the speed of the electric motor and fan may be 5,000 or more, and the intermediate buttons will, by operating them successively, provide a successive and progressive increase of the speed of the electric motor and fan between the minimum and maximum, the minimum in the case of the arrangement shown in Fig. 1, starting from zero, but in the arrangement shown in Fig. 2, the minimum commences from the speed of the engine when switching on the electric motor, and the speed of the latter surpasses and overruns that of the engine.

Referring to Fig. 4, a series of conducting studs or contacts 1, 2, 3, 4, and 5, are arranged concentrically upon a bracket or quadrant conveniently placed a little below the steering wheel, the lever K has an angular movement of the central pillar and may be moved to complete the circuit through either of the said contacts, to supply electric current to the electric motor.

Figure 7:
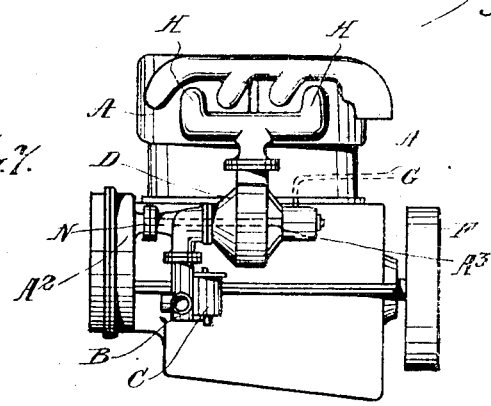
Fig. 7 is an elevation to a smaller scale of the controlled pressure carbureting apparatus on an engine arranged to be driven at normal speeds by the crank shaft at engine speed, and to be overrun by an electric motor when a greater delivery of mixture is required.
Figure 8:
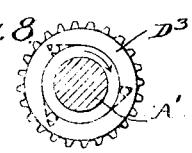
Fig. 8 is a detail view of the overrun clutch employed in the construction illustrated in Figs. 1, 2, 5 and 6.

Referring to Fig. 7, in this arrangement the carbureter fan in the casing D is driven normally at the same relative speed, by means of a free wheel or one-way clutch N, on the crank shaft. The said free wheel N is mounted upon a short shaft passing through the half speed gear casing $A^2$ of the engine A, and adapted to be driven by suitable gearing from the crank or half speed shafts. The fan shaft $A^3$ in alinement therewith (shown in dotted lines) is secured to the outer ring of the one-way clutch. When the electric motor F is supplied with current through the steering wheel control previously described, the fan is driven at a higher speed than before, the free-wheel clutch N permitting the one shaft A³ to overrun the other or gear shaft in the casing A².

It will be understood that the apparatus may be used with any known carbureter adaptable for the purpose.

It will also be understood that although the control buttons or switch are shown on the steering wheel, the apparatus being shown as applied to a motor vehicle, the apparatus may be applied to other internal combustion engines than those employed for these vehicles, when the control may be mounted suitably and differently.

What I do claim as my invention and desire to secure by Letters Patent is:—

1. In a motor vehicle, the combination of an internal combustion engine for propelling the vehicle, fuel delivering means, a pump for delivering mixture in increased volume to the engine above the normal produced by the engine suction, an electric motor, an operative connection between the pump and the internal combustion engine and between the pump and electric motor, said connection providing for the operation of the pump by the engine and also for the operation of the pump by the electric motor at an increased speed from that of the engine.

2. In a motor vehicle, the combination of an internal combustion engine for propelling the vehicle, a carbureter, a centrifugal fan for increasing the supply to the engine above the normal produced by the engine, said fan being mounted on the crank shaft of the engine, an electric motor, and an operative connection between the centrifugal fan, the crank shaft of the internal combustion engine, and the electric motor, said connection providing for the driving of the fan from the crank shaft of the internal combustion engine and also the driving of the fan from the electric motor at an increased speed from that of the crank shaft of the engine.

JAMES DENNIS ROOTS.

Witnesses:
 O. J. WORTH,
 A. NUTTING.